May 14, 1968  D. C. HOWLAND  3,382,890
CONICAL SHAPED VALVE MEMBERS WITH COACTING TUBULAR MEMBERS
Filed Sept. 18, 1964  2 Sheets-Sheet 1

INVENTOR.
DONALD C. HOWLAND
BY
ATTORNEY

May 14, 1968 D. C. HOWLAND 3,382,890

CONICAL SHAPED VALVE MEMBERS WITH COACTING TUBULAR MEMBERS

Filed Sept. 18, 1964 2 Sheets-Sheet 2

INVENTOR.
DONALD C. HOWLAND
BY
ATTORNEY

United States Patent Office 3,382,890
Patented May 14, 1968

3,382,890
CONICAL SHAPED VALVE MEMBERS WITH COACTING TUBULAR MEMBERS
Donald C. Howland, Costa Mesa, Calif., assignor, by mesne assignments, to Cadillac Gage Company, Warren, Mich., a corporation of Michigan
Filed Sept. 18, 1964, Ser. No. 397,570
4 Claims. (Cl. 137—554)

The present invention relates generally to flow control devices, and more particularly to flow control means for use in providing thrust vector control of a rocket.

The science of rocketry is fraught with many unusual problems. One such problem is the directional control of a rocket as it is speeded through space by operation of one or more rocket engines.

Such engines, of course, develop the necessary thrust for moving the rocket and its payload forward by means of a stream or jet of fluid, of one kind or another, in the rearward direction. That is, by forcing liquid or gas rearwardly out of the engine or rocket at an extremely high velocity, a reactive force is developed which causes the rocket to move in a forward direction. This principle of operation is based on the premise that each and every action is accompanied by any equal and opposite reaction. Thus, the reaction forces propel the vehicle, in a diametrically opposite direction to the action forces themselves.

The foregoing operation, of course, is utilized extensively in the field of jet propulsion. However, the manner of directing a jet propelled vehicle so that it reaches the proper destination at the proper time, becomes exceedingly important due to the high speeds and vast distances to be traveled.

Heretofore, attempts have been made to change the direction of travel of the rocket by providing external aerodynamic fins or vanes which can be moved as desired to create different side thrusts on the vehicle itself. However, such devices have serious limitations in that the launch speed of rocket vehicles is usually very small so that aerodynamic vanes and the like have very little effect in controlling the direction of movement of the vehicle. Also, many such vehicles are used for flight out of the atmosphere, in which environment, of course, aerodynamic vanes would be totally inoperative.

Another alternative means for changing the direction of flight of the rocket vehicle is to alter the direction of the thrust of the engine. That is, since the force which propels the vehicle is a reactive force which is diametrically opposite the direction of the activating force of the engine, it then follows that by altering the direction of operation of the thrust we alter correspondingly the direction of travel of the vehicle.

To accomplish this, jetevators have been employed which create an obstruction to the exhaust stream of the engine in predetermined locations to thereby create an imbalance which causes the direction of such exhaust stream to be diverted. However, this system exhibits serious shortcomings in that the use of obstructions decreases the total thrust which is available for propelling the vehicle.

More recently, secondary injection systems have been employed to overcome the above objections, which systems utilize a stream of fluid injected into the exhaust stream at predetermined locations. Such stream of injected fluid creates an obstruction in the expansion cone of the engine thereby creating a side thrust on the vehicle, but due to the fact that such injection is a relatively high velocity, the total thrust available for moving the vehicle forward is not diminished at all. In fact, the total thrust increases over the primary thrust of the rocket engine itself.

It has been found that any one of various different fluids, including both liquid and gas, may be employed in such secondary injection systems. However, to be most effective, the injected fluid must be in relatively small particles so that gases have found greater acceptance in such systems. Some liquids such as Freon which vaporizes readily can be used to advantage since they are quickly converted into the proper physical state.

Heretofore, flow control devices available for use in secondary injection systems have been considerably less than desired. Most such devices have comprised valve elements which have considerable weight and mass such that movement thereof to and from flow preventing position in the extremely high velocity injection fluid requires considerable energy and creates many undesirable conditions of turbulence and excesive eddy currents.

Typically, valve devices heretofore used and heretofore available for these purposes, have had relatively stationary valve seats and have employed valve members which are movable with respect thereto. The present invention is most prominently characterized by having the valve member stationary and the valve seat moveable with respect thereto. That is, the valve seat member which is formed with a through opening or port is caused to be moved relative to a stationary valve member, which relationship creates certain characteristics which are extremely desirable in this particular environment.

Accordingly, it is an object of the present invention to provide a valve device for use in controlling fluid pressures which are relatively high.

Another object of the present invention is to provide a valve device which is operable in environmental conditions of relatively high acceleration and deceleration.

A further object of the present invention is to provide a flow control device as characterized above wherein minimum forces are required for actuating such device from one position to another.

Another further object of the present invention is to provide a flow control device as characterized above which exhibits high dynamic response due to the relatively small mass and weight of the movable parts.

A still further object of the present invention is to provide a flow control system having a plurality of such valve devices as characterized above and an electrohydraulic servo system for actuating such flow control devices in unison.

A more specific object of the present invention is to provide a unitary flow control system as characterized above wherein feedback means is employed for accurately positioning the valve devices in any desired position between flow preventing and maximum flow permitting positions.

Another object of the present invention is to provide a flow control device as characterized above wherein the movable control member is tubular in construction and not only controls the flow of fluid but also constitutes the outlet port for such valve device.

Another object of the present invention is to provide a valve device as characterized above wherein the flow controlling end portion of the tubular control member is beveled to minimize forces thereon to be overcome in moving such member to flow preventing position.

A still further object of the present invention is to provide a valve device as characterized above which is provided with a stationary valve member having a generally conically-shaped valve portion to minimize the creation of turbulence and eddy currents in the flow of fluid through the outlet port.

An additional object of the present invention is to provide valve devices as characterized above which are simple and inexpensive to manufacture, and which are rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings in which FIGURE 1 is a perspective view of a valve unit or system for use on an exhaust nozzle of a rocket engine.

Like reference characters indicate corresponding parts throughout the several views of the drawings.

Figure 1:
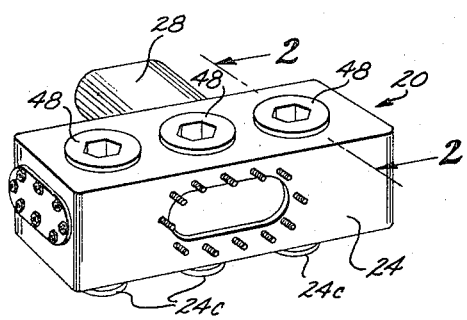

Referring to FIGURE 1 of the drawings, there is shown therein a flow control unit or system 20 for use in a secondary injection system on a rocket engine. As shown most clearly in FIGURE 9 of the drawings, a rocket engine is formed with an expansion cone 22 through which the exhaust of the engine is forced so as to create a forced reactive force on the vehicle itself. Such expansion cone 22 enables the exhaust stream to expand in creating such force on the vehicle.

Figure 9:
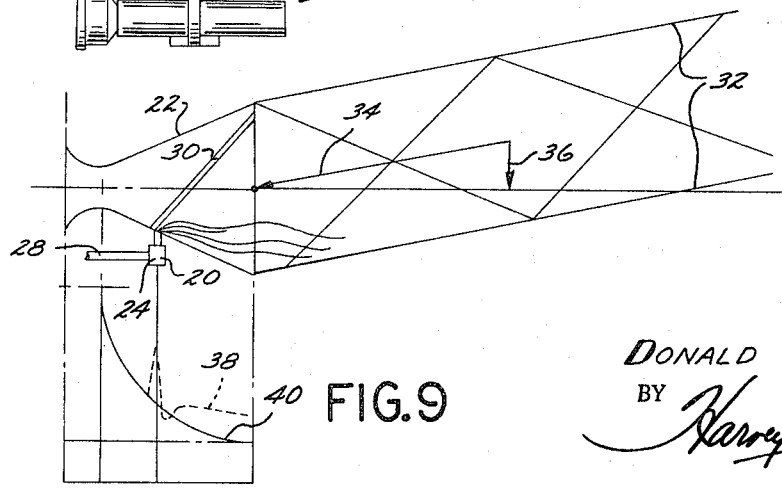
FIGURE 9 is a schematic showing of the operational effect of secondary injection in a rocket engine.

The flow control unit 20 is provided with a housing 24 which is fastened to the expansion cone 22 as shown schematically in FIGURE 9. Such housing 24 is formed with a fluid chamber 26 which communicates with an inlet conduit 28 connected to an appropriate source (not shown) of fluid under pressure.

As shown in FIGURE 9, flow control unit 20 affords fluid pressure to the expansion cone 22 at an appropriate angle to the direction of the primary injection therein. Such secondary or lateral injection creates a shock 30 at an angle across the expansion cone as shown in FIGURE 9. As a result, a sidewise force or thrust is exerted on the exhaust stream so that the direction of the resultant force on the vehicle itself is diverted as indicated by the lines 32 in FIGURE 9. This, of course, causes the force applied to the vehicle to be broken down into a forward thrust indicated by vector 34 and a sidewise thrust indicated by vector 36. The latter, of course, urges the rocket and vehicle attached thereto in a sidewise or lateral direction.

As shown in the graph in FIGURE 9, the composite or resultant force on the vehicle is larger than the primary force itself as indicated by the relative positions of lines 38 and 40.

As will be readily apparent to those persons skilled in the art, the flow control unit 20 may consist of substantially any number of individual flow control devices 42 depending upon the function to be obtained. That is, if the rocket engine is relatively large and it is deemed necessary to have a correspondingly large amount of secondary injection at each location on the expansion cone, then unit 20 may be provided with a relatively large number of valve devices 42.

Since all of the valve devices 42 are of identical construction and operation, only one such device will be described in detail, it being well understood by those persons skilled in the art that the other devices have identical parts which operate in the same manner.

Housing 24 of valve unit 20 is formed with a sidewall 24a having a plurality of through openings or mounting holes 44, one for each of the valve devices 42 of the valve unit 20. Each such mounting hole is formed with internal fastening threads as at 44a, and is provided with an annular groove or cutout 44b for receiving a sealing O-ring 46.

A stationary valve member 48 is mounted in each of such opening 44 and is provided with suitable external fastening threads for cooperation with the internal fastening threads 44a to firmly secure the valve member 48 in the housing 24. Each such valve member is further provided with an annular flange or shoulder 48a for abutting engagement with the wall 24a of housing 24.

The O-rings 46, of course, effectively hermetically seal the respective valve members 48 in the housing 24.

To facilitate positioning of the valve members 48 in the housing 24, they may be provided with suitable tool-receiving openings as at 48b. As shown most clearly in FIGURE 1 of the drawings, such openings may be hexagonal in shape to receive a correspondingly-shaped wrench.

Figure 3:
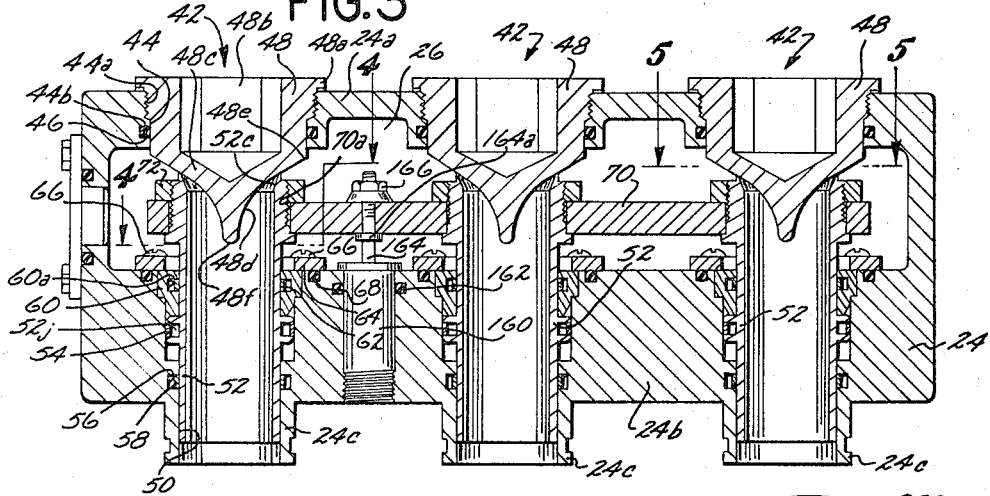
FIGURE 3 is a sectional view through the various valve devices of FIGURE 1, taken substantially along line 3—3 of FIGURE 2.

Housing 24 is further provided with a relatively thick or heavy wall 24b which may include an extended portion 24c for each valve device embodied in the housing. Formed in sidewall 24b is a through opening 50 for each such valve device. These openings, as shown in FIGURE 3, are aligned with the respective mounting holes 44 in the sidewall 24a of housing 24 to insure proper alignment of the various valve parts. In fact, the openings 44 and 50 are preferably formed following a single setting or position of the housing 24 to insure proper adjustment thereof.

Figure 7:
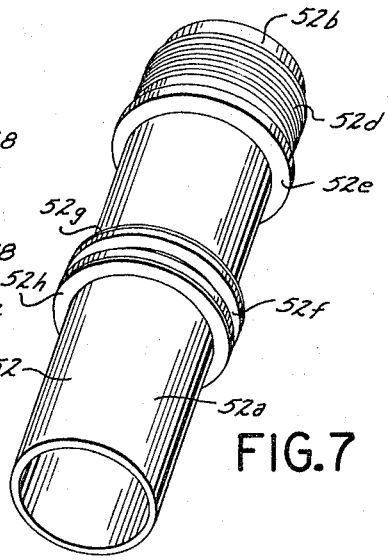
FIGURE 7 is a perspective view of the tubular valve seat or flow control member of such devices.

Slidably positioned within each such cylindrical opening 50 is a movable valve seat member or flow control member 52 which is generally tubular in construction as shown most clearly in FIGURE 7. Each such valve seat member is formed with a main body portion 54 characterized by having a relatively thin side wall for purposes which will hereinafter be described in detail. One end 52b of flow control member 52 is formed with a beveled valve seat as shown at 52c, the beveled surface being formed internally of the control member 52 to insure proper flow controlling engagement between seat member 52 and valve member 48 while minimizing the forces exerted on member 52 as will hereinafter be explained.

As further shown in FIGURE 7, each flow control member 52 is formed with external fastening threads 52d and an annular flange or shoulder 52e.

Positioned intermediately of tubular body 52a is an annular pressure responsive element 52f affording pressure surfaces 52g and 52h which, as will hereinafter be explained, cause the pressure responsive element 52f to act as a piston. Suitable sealing means 54 is inserted within an annular groove or cutout 52j in the pressure responsive element to prevent escape of fluid pressure, as will hereinafter appear.

Housing 24 is further formed with an annular groove 56 in each outlet opening 50. Suitable annular sealing means 58 is inserted within such groove 56 to effectively hermetically seal the flow control member 52 therewithin.

To facilitate assembly of the seat members 52 within their respective outlet openings, there is provided at the upper end of each such opening 50, as viewed in FIGURE 3, a bearing-sealing member 60. Each member 60 is formed with a central through opening and with an annular groove or cutout 60a for receiving suitable annular sealing means 62. A retaining ring 64 is mounted over the end of each member 60 by means such as fastening screws 66 to thereby retain such member 60 in assembled position. Suitable O-rings 68 are positioned in appropriately formed cutouts in housing 24 to hermetically seal such mounting rings 64 in place.

A yoke 70 effectively ties the various movable valve seat members 52 together. Such yoke is formed with an appropriate number of through openings 70a which receive the external fastening threads 52d of the respective seat members. A fastening nut 72 is then threadedly positioned on each seat member 52 to urge yoke 70 into engagement with the shoulder 52e of the respective seat member 52.

As shown, each stationary valve member 48 is formed with a generally conically-shaped portion 48c within the fluid chamber 26. Such portion provides a generally conical surface 48d for each valve member to generally direct the fluid under pressure from the chamber 26 to the respective seat member 52 as will hereinafter be explained. In fact, it has been found most desirable to provide such portions 48c of the valve members 48 with a generally "tear-drop" configuration affording the surface 48d with an arcuate shape from the base 48e to the apex 48f of the general cone shape.

Figure 6:
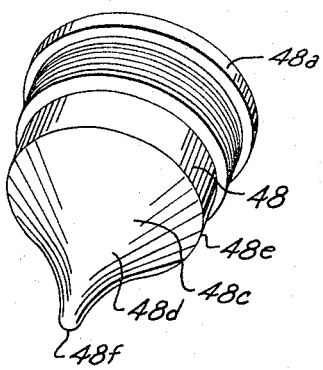
FIGURE 6 is a perspective view of the stationary valve member used in each valve device.

As shown most clearly in FIGURE 6, the apex 48f of the conically-shaped portions 48c are positioned within the respective valve seat members 52, substantially coaxial thereof. This configuration provides a smooth uninterrupted path for the flow of fluid from chamber 26 into the seat members 52 while minimizing turbulence and the creation of eddy currents.

It is contemplated within the scope of the present invention that the tubular valve seat members may be actuated from one position to another by any appropriate actuator. The use of piston-like pressure responsive member 52f on each valve seat member 52 causes the device shown in the drawings to be particularly well adapted for actuation by servo means of the electro-hydraulic type. One form of such servo system is shown in FIGURE 8 of the drawings in association with one of the flow control devices 42.

Figure 2:
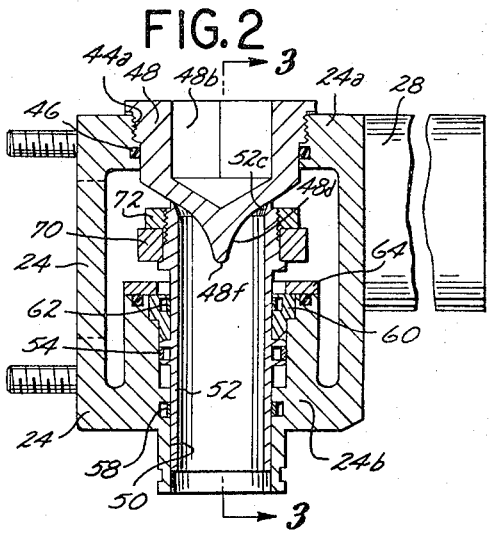
FIGURE 2 is a sectional view of one of the valve devices of the unit of FIGURE 1, taken substantially along line 2—2 of such figure.
Figure 8:
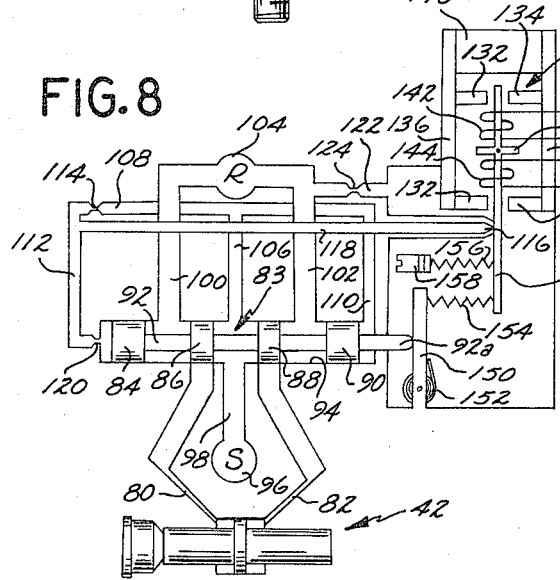
FIGURE 8 is one form of electro-hydraulic servo system for use in controlling the actuation of such valve devices.

Although not shown in detail in FIGURES 2 and 3, there is provided in housing 24 suitable conduits as shown at 80 and 82 of FIGURE 8 which conduct fluid pressure to opposite sides of the pressure responsive element 52f. In this regard, it may be found desirable to attach to the exterior of housing 24 in direct association with the conduits 80 and 82, an appropriate actuator such as the servo mechanism to be described.

The primary control element in the servo mechanism of FIGURE 8 is a slide valve 83 which comprises control pistons 84, 86, 88 and 90 tied together in fixed spaced relation by a piston rod 92. It should be borne in mind that the position of slide valve 83 within cylinder 94 determines the flow of fluid through the conduits or passages 80 and 82.

The center portion of cylinder 94 is in continuous communication with a supply 96 of fluid under a constant pressure through a passage 98 located between the conduits or passages 80 and 82. A pair of discharge passages 100 and 102 which lead to a reservoir or accumulator 104 are also in communication with cylinder 94.

The spacing and length of the center pistons 86 and 88 are such as to mate with the openings in the conduits 80 and 82. As such, when one of the conduits 80 and 82 is being supplied fluid under pressure from supply 96, the other of such conduits is exhausting fluid through the respective discharge passage 100 or 102 to the reservoir 104.

Some of the fluid under constant supply pressure from source 96 continuously flows from the cylinder 94 into a passage 106. The latter leads to passages 108 and 110, the latter of which is in communication with the end of cylinder 94 at the piston 90 therein. Passage 108 leads to another passage 112 through an orifice 114. The passage 112 communicates with a nozzle 116 through another passage 118, and with one end of cylinder 94 through an orifice 120.

Fluid from the nozzle 116 is returned to the reservoir 104 through a passage 122 having an orifice 124 therein.

Flow through the nozzle 116 is varied by a restricting flapper 126 arranged as the armature of a polarized torque motor 128. In the illustrated torque motor, the flapper is pivoted by means of a torsion spring 130 midway between the air gaps of two opposed pairs of poles 132 and 134. The latter are supported by respective end plates 136 and 138 between which a permanent magnet 140 is positioned.

The two coils of the motor are denoted 142 and 144 and the application of a differential current thereto causes magnetization of the flapper 126. As a result, one end of the flapper is polarized north and the other south depending on the direction of the differential current. The flapper 126 will therefore be attracted toward two diagonally opposite poles and will be repelled by the other two diagonal poles, since all of the poles 132 and 134 are polarized by the permanent magnet 140. These forces of attraction and repulsion result in a rotation of the flapper about its pivot point and a deflection of the flapper in the vicinity of the nozzle 116. With this arrangement the magnitude of the forces urging the flapper deflection is proportional to the magnitude of the differential current applied to the coils 142 and 144, and the direction of rotation of the flapper into a further or less restricting position of the nozzle 116 is determined by which of the coils has the larger current.

The piston rod 92 is provided with an extension 92a which engages a beam 150, the latter of which is biased toward the extension 92a by a torsion spring 152. A feedback spring 154 extends between the ends of the flapper 126 and the beam 150 and functions to transpose deflection at the outer end of the beam into spring force exerted on the flapper. Accordingly, it is seen that the beam 150 and feedback spring 154 cause an output force to be fed back from the piston rod 92 and exerted on the flapper 126. This output force is in such a direction as to oppose the input force exerted by the torque motor due to the differential current input to coils 142 and 144. The feedback spring 154 has an initial tension load and this is offset by setting the torsion spring 130 so that the flapper 126 is urged thereby away from the nozzle 116. Final adjustment is obtained by a tension spring 156 acting on the flapper in the same general direction as the feedback spring 154 and having its initial load set by a zero adjusting screw 158. The latter permits the slide valve 83 to be readily given a zero position for the condition of zero differential current input. This zero position of the slide valve usually corresponds to the position where the pistons 86 and 88 block flow through the conduits 80 and 82, but may also correspond to a position of finite flow for particular applications.

As will be readily apparent to those persons skilled in the art, upon the occurrence of the differential current in the control coils 142 and 144, the position of the flapper 126 near the nozzle 116 is varied. This causes a variation in the fluid pressures on the ends of pistons 84 and 90, primarily due to the orifices 114 and 120 which restrict the flow of fluid under pressure from source 96 to only piston 84. The flow of fluid pressure to piston 90, on the other hand, has no such restriction.

Such differential in fluid pressure applied to the opposite ends of slide valve 83 effects corresponding movement thereof thereby allowing fluid from source 96 to be applied to one side or the other of pressure responsive element 52f on one or more of the seat members 52. This is caused by movement of the pistons 86 and 88, such that upon movement of the slide valve 83 to the left, as viewed in FIGURE 8, fluid pressure is afforded through conduit 80. Reversely, if the differential pressure is such on slide valve 83 as to move it to the right as viewed in this figure, fluid pressure is then applied to the pressure responsive element 52f through conduit 82.

In either event, the conduit not connected to the source 96 is exhausted. That is, as piston 86 moved to the left to effect communication between source 96 and conduit 80, piston 88 moves correspondingly to the left so as to permit conduit 82 to exhaust some of its fluid under pressure through passage 102 to reservoir 104. In like manner, movement of slide valve 83 to the right permits conduit 80 to exhaust through passage 100 while fluid pressure is being applied to pressure responsive element 52f through conduit 82.

The afore described feedback arrangement through beam 150 and spring 154 operates to return flapper 126 to its zero position whereupon the slide valve 83 is also returned to its intermediate position. As such, the slide valve is returned to its position wherein fluid flow is prevented through both of the conduits 80 and 82.

As a result of the foregoing, it is seen that the valve seat members 52 are caused to be moved a distance determined by the amount of differential current applied to coils 142 and 144. That is, the amount of such differential current determines the amount of force required to return flapper 126 to its zero position. Such return force, of course, is determined by the amount of movement of slide valve 83 and hence the amount of force applied by feedback spring 154 to flapper 126. The result, of course, is a servo system whereby a feedback network is employed for returning the flapper 126 to its zero position after the valve seat members have been actuated to their desired positions.

The yoke 70, as above described, ties all of the valve seat members 52 together so that they operate as a unitary structure. As such, only one of the valve seat members may be directly associated with the servo system, if desired, the remaining valve seat members being actuated therewith due to such interconnection. On the other hand, each valve seat member 52 may have its own servo system, the yoke 70 merely serving to tie them altogether to insure simultaneous and equal operation.

As shown most clearly in FIGURE 3, the feedback to the actuating means of the servo system may be tied to the yoke 70. For instance, as shown in said figure, any appropriate feedback device 160 may be mounted within the wall 24b of housing 24. Suitable sealing means such as an O-ring 162 positioned within an appropriate annular groove or cutout in wall 24b may be employed to properly hermetically seal the feedback element 160 therewithin. A stem 164 for sensing the movement and position of the various valve seat members 52 extends from the feedback device 160 and is attached to yoke 70 by means of a shoulder 164a and a nut 166 threadedly positioned on the end of stem 164.

The feedback device 160 may be merely a potentiometer or any similar electrical device for providing an electrical signal which varies in accordance with variations in the position of yoke 70. As such, as will be readily apparent to those persons skilled in the art, an electrical indication of the position of the various valve seat members is always available for comparison with an electrical "command signal" for indicating the desired or "command" position of the valve seat members. That is, an electro-responsive actuator can be provided which will respond to an electrical signal to effect actuation of the several valve seat members from one to another position. Thereafter, the electrical signal corresponding to the actual position of the valve seat members is fed back to the electro-responsive actuator so that the "command" signal is canceled by the "actual position" signal only when the actual position of the valve seat members coincides with the selected or command position thereof.

Throughout the aforedescribed operation of the valve seat members 52, the chamber 26 within housing 24 is provided with the secondary injection fluid through conduit 28. As the valve seat members are caused to move away from the respective valve members 48, such fluid is permitted to flow from the chamber 26 through the respective valve seat members and into the expansion cone of the rocket engine as described above. The amount of fluid thus injected is directly related to the position of the various valve seat members. That is, maximum fluid injection will be obtained when the several valve seat members are in their maximum flow permitting positions. Partial fluid injection will be obtained with the valve seat members located in intermediate positions, between flow preventing and maximum flow permitting positions.

Such flow of fluid from chamber 26 into and through the port of the respective valve seat members 52 is accomplished with minimum turbulence and creation of eddy currents. The "teardrop" conical configuration of the stationary valve members 48 causes the fluid to flow in a continuous uninterrupted manner from the chamber through the valve seat members. That is, with each stationary valve member coaxially aligned with the respective valve seat members, the fluid is directed from the chamber toward the center of the valve seat member itself.

The beveled end portion 52c enables each valve seat member to be easily forced through the injection fluid, without the need for overcoming relatively large forces. That is, such beveled configuration enables the valve seat members to be moved in an endwise direction to flow preventing position in engagement with the respective valve members 48.

Figures 4, 10:
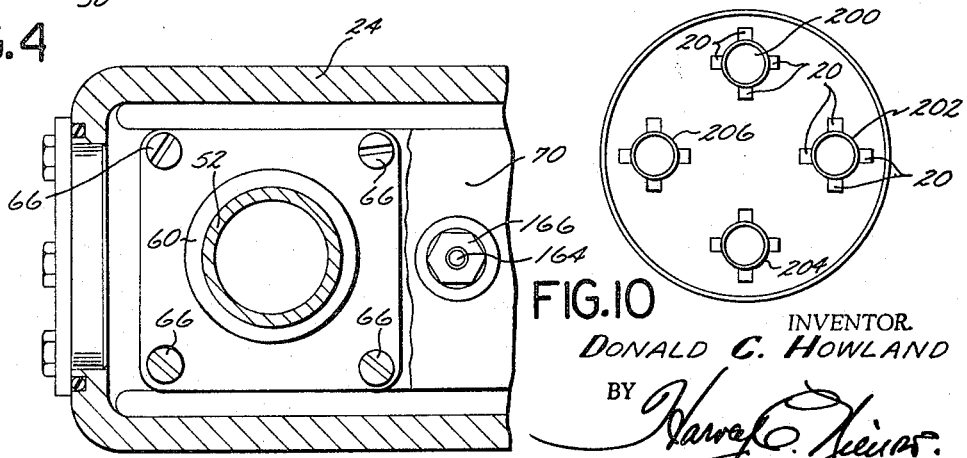
FIGURE 4 is a fragmentary sectional view of the valve unit of FIGURE 3, taken substantially along line 4—4 thereof.
FIGURE 10 is an end elevational view of one configuration of thrust vector control valves for use on a rocket engine.
Figure 5:
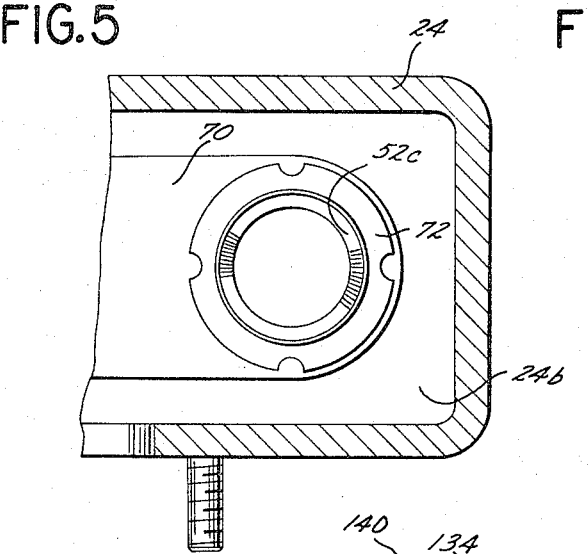
FIGURE 5 is a similar fragmentary sectional view taken substantially along line 5—5 of FIGURE 3.

In FIG. 10 of the drawings, there is shown a secondary injection configuration for a rocket engine having four equally spaced expansion cones 200, 202, 204 and 206. Each such expansion cone is provided with four angularly spaced flow control units 20 for maneuverability of the rocket engine.

It is thus seen that the present invention provides a flow control device which is particularly well adapted for use in secondary fluid injection for controlling the direction of travel and position of a rocket vehicle. Such device is most prominently characterized by having a stationary valve member and a removable valve seat member for cooperation therewith.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. An electro-hydraulic operated flow control valve comprising in combination, a housing formed with a fluid pressure chamber having an inlet and an outlet, a stationary valve member in said housing having a portion exposed to fluid pressure in said chamber, a tubular valve seat member having an annular valve seat and a valve port therewithin, said seat member being slidably mounted in the outlet of said chamber for flow preventing and flow permitting cooperation of said valve seat and said valve member, an annular pressure responsive member on said seat member externally thereof, means affording fluid conduits to opposite sides of said pressure responsive member, electro-responsive fluid pressure means connected to said conduit to alternatively afford fluid pressure to said opposite sides of said pressure responsive member to position accordingly said annular seat and said valve port of said tubular seat member relative to said valve member, and electrical feedback means comprising means affording an electrical signal indicative of the actual position of said seat member and position selection means for providing an electrical signal corresponding to the predetermined selected position for said seat member.

2. An electro-hydraulic operated flow control valve according to claim 1 wherein said feedback means further comprises means for comparing said actual position signal with said selected position signal to energize accordingly said electro-responsive means to cause said tubular seat member to be positioned accordingly.

3. An electro-hydraulic operated flow control valve comprising in combination, a housing formed with a fluid pressure chamber having an inlet and a plurality of outlets, a stationary valve member in said housing for each of said outlets having a portion exposed to fluid pressure in said chamber, a tubular valve seat member for each stationary valve member having an annular valve seat and a valve port therewithin, said seat member being slidably mounted in the respective outlet of said chamber for flow preventing and flow permitting cooperation of said valve seat and said respective valve member, a pressure responsive member on each seat member, means forming fluid conduits to opposite sides of each of said pressure responsive members, electro-responsive fluid pressure means connected to said conduit means to alternatively afford fluid pressure to said opposite sides of said pressure responsive members to simultaneously position accordingly said annular seat and valve port of each of said tubular seat members relative to the respective valve member, interconnection means for said valve seat members to insure simultaneous operation thereof, and electrical feedback means comprising means associated with said interconnecting means affording an electrical signal indicative of the actual position of said seat members.

4. A flow control device comprising in combination, a housing formed with a fluid chamber having an inlet and a plurality of outlets, a valve member for each outlet removably fixed to said housing and formed with fastening means for operation externally of said chamber to individually remove and replace said valve members, each of said valve members having a conically shaped portion projecting into said fluid chamber and a continuous side wall which is arcuate in shape from the apex to the base of said conical shape to provide a relatively uninterrupted path for the flow of fluid from said chamber to said outlet, a tubular valve seat member for each valve member mounted in the corresponding outlet of said housing for movement between flow preventing position in engagement with said conical portion of said respective valve member to flow permitting position in spaced relation thereto, interconnecting means for said valve seat members to insure simultaneous movement thereof, and electrical means connected relative to said interconnecting means to provide a signal indicative of the position of said valve seat members within said housing.

References Cited

UNITED STATES PATENTS

| | | | |
|---|---|---|---|
| 772,910 | 10/1904 | McKechney | 251—353 |
| 910,092 | 1/1909 | Simonds | 251—30 |
| 2,082,032 | 1/1936 | White | 137—607 |
| 3,228,413 | 1/1966 | Stevens | 251—353 |
| 2,676,611 | 5/1954 | Page | 251—31 X |
| 2,918,249 | 12/1959 | Page et al. | 251—31 |
| 3,227,179 | 1/1966 | Rosaen | 137—625.61 |

FOREIGN PATENTS

| | | |
|---|---|---|
| 787,585 | 12/1957 | Great Britain. |
| 1,280,679 | 11/1961 | France. |

ARNOLD ROSENTHAL, *Primary Examiner.*

M. CARY NELSON, *Examiner.*

J. W. KNIGHT, *Assistant Examiner.*